March 29, 1938.   H. R. TEAR   2,112,450
LUBRICATING DEVICE
Filed Dec. 12, 1936
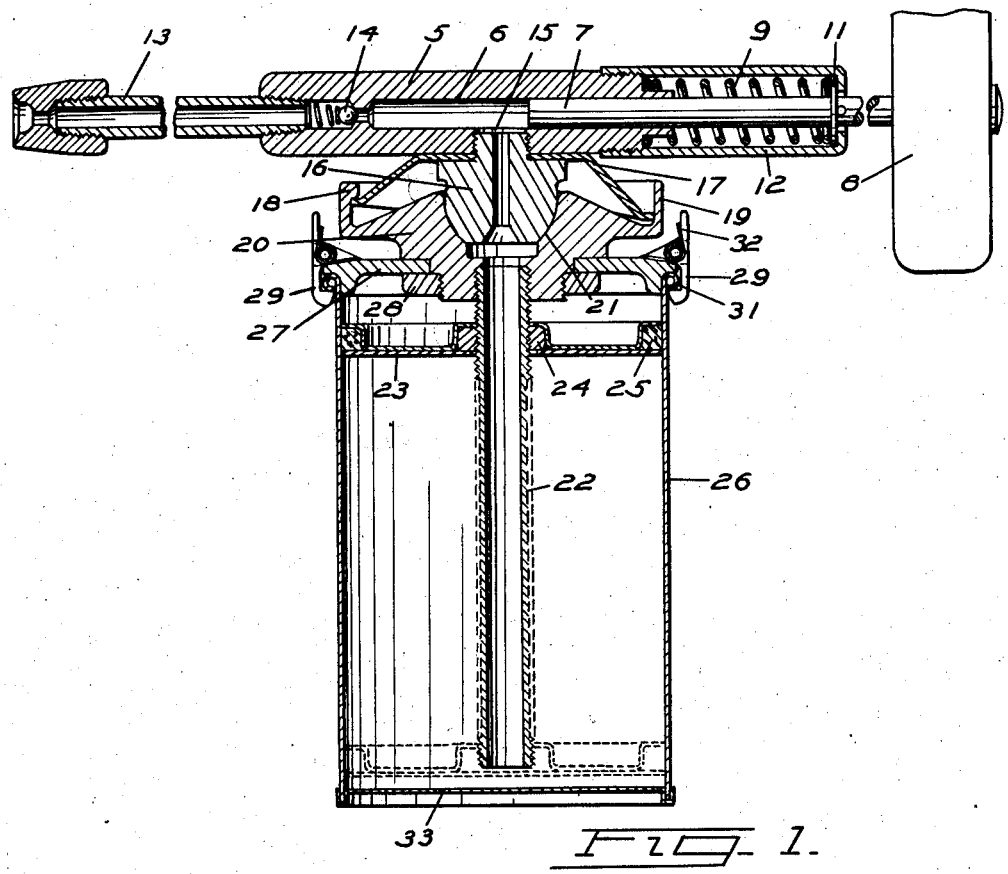
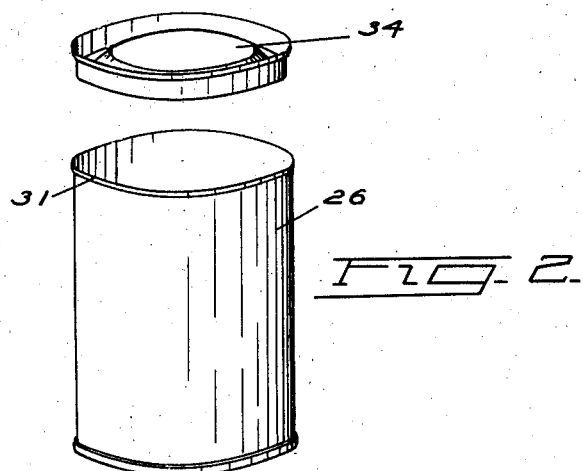
INVENTOR.
HARRY R. TEAR.
BY McConkey & Booth.
ATTORNEYS.

Patented Mar. 29, 1938

2,112,450

UNITED STATES PATENT OFFICE 2,112,450

LUBRICATING DEVICE

Harry R. Tear, Evanston, Ill., assignor to The Lubrication Corporation, Chicago, Ill., a corporation of Delaware Application December 12, 1936, Serial No. 115,495

13 Claims. (Cl. 221—47.4)

This invention relates to lubricating devices and more particularly to lubricant dispensers for use with interchangeable factory-filled lubricant containers.

For the purpose of servicing a machine, different parts of which require different types of lubricant, it is desirable to be able to change the lubricant supply to a dispenser or pump quickly and easily. Where this can be done a single dispenser or pump can be used to perform in succession a series of different lubricating operations requiring different types of lubricant, thus providing great savings in investment and space over that required where a separate pump must be provided for each operation.

One of the objects of the present invention is to provide a lubricant dispenser which utilizes an extremely simple and cheap type of lubricant container as a source of supply and in which containers can be changed quickly and easily to enable the grade or type of lubricant being dispensed to be changed.

Another object of the invention is to provide a lubricant dispenser having a magazine element adapted to be secured to a lubricant container and which element may be detachably secured to the dispenser.

Another object is to provide a novel magazine element adapted to carry a lubricant container and which may be detachably secured to a lubricant dispenser.

Other objects and advantages of the invention will appear from the following description when read in connection with the accompanying drawing in which:

Figure 1 is a central section of a lubricating device embodying the invention; and Figure 2 is a perspective view of a container for use with the device of Figure 1.

The device illustrated comprises a pump body 5 having a cylindrical bore 6 therein to receive a piston 7 carrying an operating handle 8 at its outer end. A coil spring 9 is preferably provided acting between the body 5 and a washer 11 on the piston to urge the piston outwardly of the body. The spring may, if desired, be housed in a sleeve 12 which also forms a stop to limit outward movement of the piston 7. A suitable nozzle 13, formed for sealing engagement with a lubricant receiving fitting, is connected to the body 5 in communication with the cylinder 6, a suitable check valve 14 being provided to prevent return flow of lubricant from the nozzle into the pump cylinder.

The cylinder 6 is formed intermediate its length with an inlet opening 15 having a stud 16 secured thereto in communication with the inlet opening, the outer surface of the stud preferably being formed as a zone of a sphere for a purpose to appear later. A connecter plate 17 is secured to the body 5 concentrically with the stud 16 and is formed at its outer periphery with a series of slots and cam portions for making a bayonet connection with lugs 18 carried by an annular flange 19 on the body portion 20 of a magazine element. The body portion 20 is formed with a central outlet opening having a concave spherical wall as indicated at 21 for sealing engagement with the spherical surface of the inlet stud 16. An open inlet tube 22 formed with screw threads on its outer surface throughout its length is secured to the body portion in communication with the outlet opening and carries a piston 23 having a nut 24 for screw threaded engagement with the tube 22, the piston having an annular packing 25 around its periphery for engagement with the inner wall of a lubricant container 26. A head member 27 is rotatably mounted on the body portion 20 by means of a nut 28 and carries a series of clamp fingers 29 adapted to engage an annular bead 31 formed at one end of the container 26. Preferably the clamp fingers 29 are urged into clamping position by springs 32.

The container 26 is open at the end adjacent the bead 31 and is formed with a fixed closure 33 at its opposite end. If desired, the head member 27, the piston 23, and the container may be formed with a non-circular cross section to insure that the piston will not rotate relatively to the cartridge. Containers such as the container 26 may be filled at the factory of a lubricant manufacturer and may be printed or otherwise labeled to indicate both the manufacturer and the type of lubricant therein. When the containers are shipped from the factory and during storage thereof, the open end may be closed by a suitable friction cover indicated at 34 in Figure 2.

To use the device, the cover 34 of a cartridge is first removed and the container is secured to the head member 27 with the tube 22 projecting thereinto to a point adjacent the closed end 33 of the container. The magazine element may then be screwed to a dispenser by means of the lugs 18 and bayonet plate 17 with the outlet opening of the magazine element in sealing engagement with the inlet stud 16. The container may then be rotated, turning the head member 27 on the body member 20 and turning the piston 23 with the container, thereby to screw the piston along the tube 22 to force the contents of the container through the tube and into the pump cylinder 6. When the pump cylinder is filled the plunger 7 may be operated to force the contents thereof through the nozzle 13 into a fitting.

It will be understood that a plurality of magazine elements may be provided for each dispenser so that a container containing a different type of lubricant may be secured to each magazine element. To change the type of lubricant being dispensed it is merely necessary to disconnect one magazine element from the dispenser and to connect another magazine element thereto.

While only one embodiment of the invention has been shown and described, it will be apparent that many changes might be made therein, and it is not intended to be limited to the exact form shown or otherwise than by the terms of the appended claims.

What is claimed is:

1. A lubricating device comprising a lubricant pump, an inlet stud carried by the pump, a magazine element having an outlet opening formed for sealing engagement with said inlet stud, means for detachably securing said magazine element to the pump with its outlet opening in sealing engagement with the stud, and means carried by said magazine element for securing a lubricant container thereto.

2. A lubricating device comprising a lubricant pump, an inlet stud carried by the pump, a magazine element having an outlet opening formed for sealing engagement with said inlet stud, means for detachably securing said magazine element to the pump, means carried by said magazine element for securing a lubricant container thereto, a piston carried by said magazine element, and means for forcing said piston through a container secured to the magazine element to force the contents thereof into the pump.

3. A lubricating device comprising a lubricant pump, an inlet stud carried by the pump, a magazine element having an outlet opening formed for sealing engagement with said inlet stud, means for detachably securing said magazine element to the pump, means carried by said magazine element for securing a lubricant container thereto, an inlet tube carried by said magazine element in communication with said outlet, and a piston movably carried by said tube.

4. A lubricating device comprising a lubricant pump, an inlet stud carried by the pump, a magazine element having an outlet opening formed for sealing engagement with said inlet stud, means for detachably securing said magazine element to the pump, a head member rotatably carried by said magazine element and having means for detachable connection to a lubricant container, an inlet tube carried by said element in communication with said outlet opening, and a piston having screw threaded engagement with said tube.

5. A lubricating device comprising a pump, an inlet stud carried by the pump, a connector plate secured to the pump concentrically with the stud, a magazine element having an outlet opening formed for sealing engagement with said stud, a connector element carried by the magazine element concentric with the outlet opening and having means for forming a bayonet joint with the connector plate, and means on the magazine element for connecting a lubricant container thereto.

6. A lubricating device comprising a pump, an inlet stud carried by the pump, a connector plate secured to the pump concentrically with the stud, a magazine element having an outlet opening formed for sealing engagement with said stud, a connector element carried by the magazine element concentric with the outlet opening and having means for forming a bayonet joint with the connector plate, an inlet tube carried by the magazine element in communication with said outlet opening, and means for securing a lubricant container to the magazine element with said tube projecting into the container.

7. A lubricating device comprising a pump, an inlet stud carried by the pump, a connector plate secured to the pump concentrically with the stud, a magazine element having an outlet opening formed for sealing engagement with said stud, a connector element carried by the magazine element concentric with the outlet opening and having means for forming a bayonet joint with the connector plate, an inlet tube carried by the magazine element in communication with said outlet opening, means for securing a lubricant container to the magazine element with said tube projecting into the container, and a piston carried by said tube for forcing lubricant in the container through said tube and into the pump.

8. A lubricating device comprising a lubricant pump, an inlet stud carried by the pump, a magazine element having an outlet opening formed for sealing engagement with said inlet stud, means for detachably securing said magazine element to the pump with its outlet opening in sealing engagement with the stud, an interchangeable lubricant container, and means for securing said container to the magazine element in communication with said outlet opening.

9. A lubricating device comprising a lubricant pump, an inlet stud carried by the pump, a magazine element having an outlet opening formed for sealing engagement with said inlet stud, means for detachably securing said magazine element to the pump, an inlet tube carried by the magazine element in communication with said outlet opening, an interchangeable lubricant container, means for securing said container to the magazine element with said tube projecting into the container, and a piston carried by said tube and adapted to be moved through the container to force the contents thereof through the tube into the pump.

10. A lubricating device comprising a lubricant pump, an inlet stud carried by the pump, a magazine element having an outlet opening formed for sealing engagement with said inlet stud, means for detachably securing said magazine element to the pump, an inlet tube carried by the magazine element in communication with the outlet opening, a head member mounted on the magazine element for rotation relatively to said tube, an interchangeable lubricant container, means for securing said container to the head member with the tube projecting into the container, a piston screw-threaded on the tube and fitting in the container whereby when the head member, container, and piston are turned the piston will move through the container to force the contents thereof through the tube and into the pump.

11. A lubricating device comprising a pump, an inlet stud carried by the pump, a connector plate secured to the pump concentrically with the stud, a magazine element having an outlet opening formed for sealing engagement with said stud, a connector element carried by the magazine element concentric with the stud and having means for forming a bayonet joint with the connector plate, an inlet tube carried by the magazine element in communication with the outlet opening, a head member mounted on the magazine element for rotation relatively to said tube, an interchangeable lubricant container, means for securing said cartridge to the head member with the tube projecting into the container, a piston screw-threaded on the tube and fitting in the container whereby when the head member, container, and piston are turned the piston will move through the container to force the contents thereof through the tube and into the pump.

12. In a lubricating device having a convex inlet stud, a magazine element comprising a body portion formed with an outlet opening defined by a concave wall portion for sealing engagement with said stud and means for securing said body portion to a dispensing device with the outlet opening in sealing engagement with the stud, a head member rotatably carried by said body portion, and means on said head member for detachable connection to a lubricant supply container.

13. In a lubricating device having a convex inlet stud, a magazine element comprising a body portion formed with an outlet opening defined by a concave wall portion for sealing engagement with said stud and means for securing said body portion to a dispenser with the outlet opening in sealing engagement with the stud, a head member rotatably carried by said body portion, means on said head member for detachable connection to a lubricant supply container, an inlet tube carried by said body portion in communication with said outlet opening, and a piston screw-threaded on said inlet tube.

HARRY R. TEAR.